(12) United States Patent
Munday

(10) Patent No.: US 6,516,885 B1
(45) Date of Patent: Feb. 11, 2003

(54) REDUCING WATER FLOW

(75) Inventor: Keith Munday, Loughborough (GB)

(73) Assignee: Lattice Intellectual Property LTD, London (GB)

( * ) Notice: Subject to any disclaimer, the term of this patent is extended or adjusted under 35 U.S.C. 154(b) by 0 days.

(21) Appl. No.: 09/622,225

(22) PCT Filed: Jan. 26, 1999

(86) PCT No.: PCT/GB99/00114

§ 371 (c)(1),
(2), (4) Date: Sep. 20, 2000

(87) PCT Pub. No.: WO99/42700

PCT Pub. Date: Aug. 26, 1999

(30) Foreign Application Priority Data

| Feb. 18, 1998 | (GB) | ............................................. 9803331 |
| Nov. 12, 1998 | (GB) | ............................................. 9824739 |

(51) Int. Cl.$^7$ ............................................. E21B 33/138
(52) U.S. Cl. ................... 166/295; 166/292; 166/294; 166/300; 507/903
(58) Field of Search .................... 166/292, 294, 166/295, 300; 507/225, 903; 523/130

(56) References Cited

U.S. PATENT DOCUMENTS

| 2,169,458 A | 8/1939 | Bent et al. ................... 166/294 |
| 2,229,177 A | 1/1941 | Kennedy et al. ............. 166/294 |
| 2,366,036 A | 12/1944 | Leverett et al. .............. 166/295 |
| 3,386,514 A | 6/1968 | Weber ..................... 166/294 X |
| 4,009,755 A | 3/1977 | Sandiford ................ 166/295 X |
| 4,069,869 A | 1/1978 | Sandiford ................ 166/294 X |
| 4,157,116 A | 6/1979 | Coulter .................... 166/292 X |
| 5,002,127 A | 3/1991 | Dalrymple et al. .......... 166/295 |
| 5,125,456 A | 6/1992 | Hutchins et al. ............ 166/295 |
| 5,150,754 A | 9/1992 | Phelps et al. ................ 166/294 |
| 5,418,217 A | 5/1995 | Hutchins et al. ......... 507/903 X |
| 5,529,124 A | 6/1996 | Hwan .......................... 166/294 |

Primary Examiner—George Suchfield
(74) Attorney, Agent, or Firm—Larson & Taylor PLC

(57) ABSTRACT

A water shut-off is provided in a hydrocarbon well by injecting a first chemical composition, effective as a relative permeability modifier polymer, into the hydrocarbon and a water zone of the well followed immediately by the injection of a second chemical composition, which forms a flow blocking polymer composition, into the zones and, after a shut-in period for reaction of the relative permeability modifier polymer, back producing the polymer compositions from they hydrocarbon zones to provide a path for the hydrocarbons from the zones while allowing the flow blocking polymer compositions to form the water shut-off in the water zones.

10 Claims, 2 Drawing Sheets

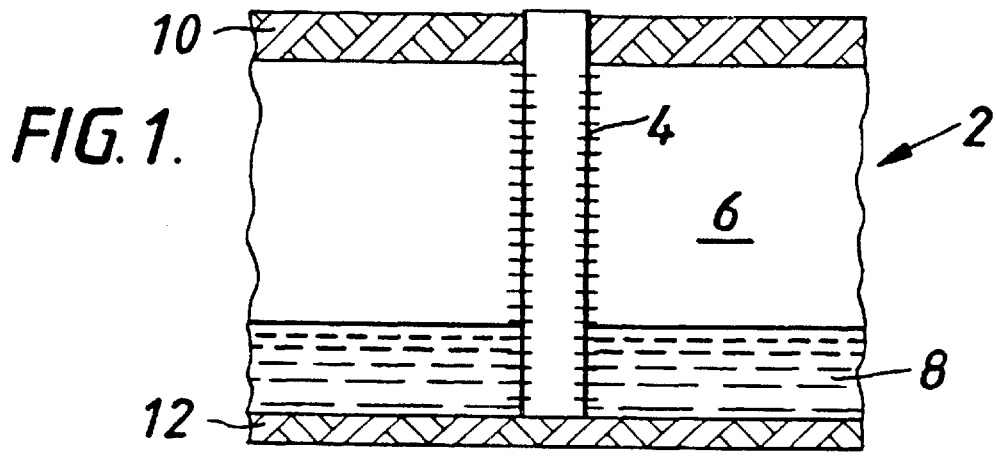
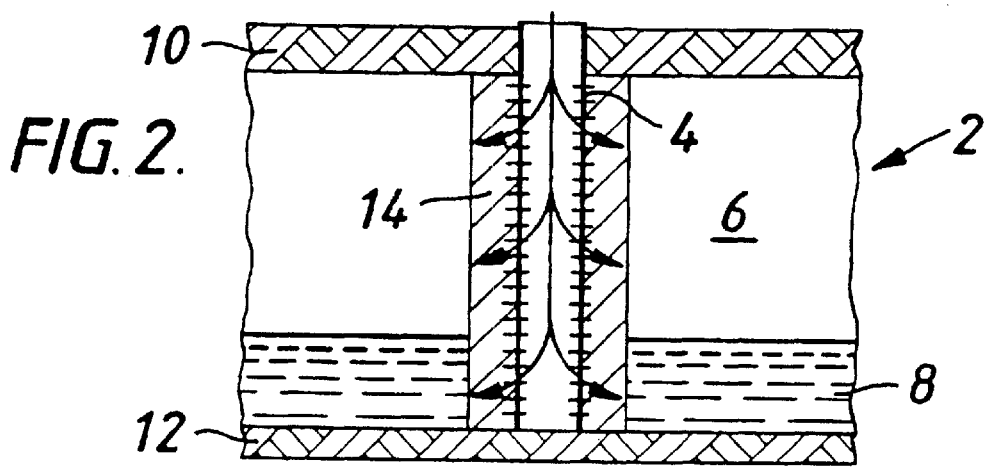
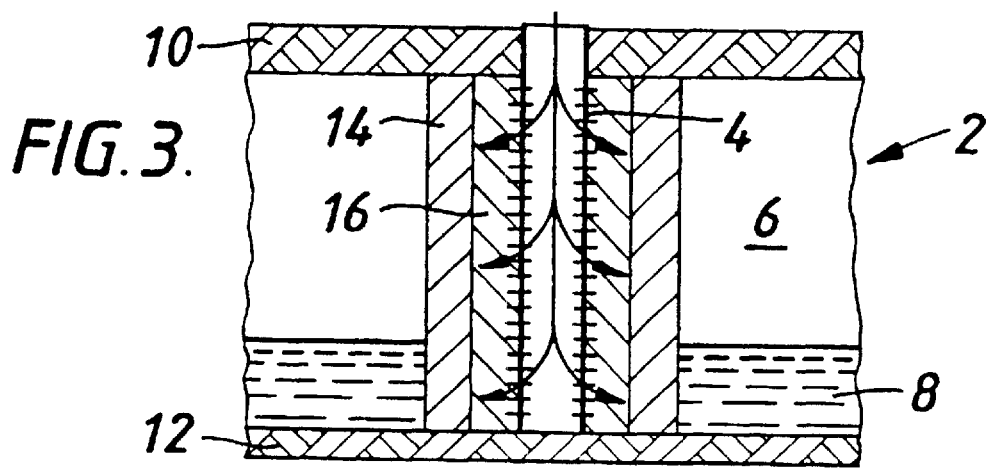

REDUCING WATER FLOW

FIELD OF THE INVENTION

This invention is concerned with improvements in or relating to a process for reducing water flow from a hydrocarbon production well and is particularly, although not exclusively, concerned with a process for forming a water shut-off in a gas well.

DESCRIPTION OF THE RELATED ART

Known gas well water shut-off processes include the UNOCAL alternating polymer-nitrogen injection process which has been used with a degree of success. The UNOCAL process is described in Society of Petroleum Engineers (SPE) 26653, "New Polymer Technology for Water Control in Gas Wells", H. T. Dovan and R. D. Hutchins, Unocal Energy Resources Technology (SPE Production & Facilities, November 1994). The UNOCAL process uses a cross-linking polymer to produce a gel block to water production with nitrogen injection forming channels for gas flow. Testing of the UNOCAL process under laboratory conditions raised doubts regarding the reliability and durability of the process. It is also known to use relative permeability modifiers, i.e. chemicals that reduce the reservoir permeability to water with minimum effect on hydrocarbon permeability and while these relative permeability modifiers represent a low risk in terms of impairment of gas production they are not wholly effective as water shut-off means in addition to which their durability is somewhat limited.

SUMMARY OF THE INVENTION

To overcome the perceived difficulty in the known processes, a permanent water shut-off mechanism was established which uses a durable polymer system. It was therefore realized that there could be unforeseen advantages over prior art processes such as the UNOCAL process or processes using the relative permeability modifiers, in combining the attributes of the UNOCAL system with the reliable MARASEAL gel system and using the combination of processes to selectively place a reliable and durable water shut-off in a water zone of a gas well. It is, therefore, an object of the present invention to mitigate or overcome the shortcomings of the prior art processes referred to herein.

Thus, the present invention conveniently provides a process for reducing water flow from a hydrocarbon production well comprising the steps of:

(a) injecting a first chemical composition reactable to form a first polymer effective as a relative permeability modifier polymer into the hydrocarbon and water zones of a reservoir;

(b) injecting a second chemical composition into said hydrocarbon and water zones, the second chemical composition reactable to form a flow blocking polymer;

(c) effecting a "shut-in" for a reaction period of the first chemical composition to form the relative permeability modifier polymer;

(d) producing a second polymer composition from said second chemical composition out from the hydrocarbon zones prior to reaction of the second polymer composition; and (e) maintaining the production of the first and second polymer compositions from the hydrocarbon zones to facilitate the creation of a passage for hydrocarbon flow therefrom while enabling the second polymer composition to react in the water zones to form a water shut-off.

Preferably step (b) of the process is effected immediately upon the completion of step (a) thereof. Advantageously, the first polymer composition comprises a cationic polyacrylamide and the second polymer composition comprises a cross-linkable polyacrylamide-chromium acetate system. Preferably, any reaction period for the first polymer composition with a cross-linking agent is less than the delay period prior to reaction of the second polymer composition.

The present invention also provides a process for forming a water shut-off including the injection of a relative permeability modifying polymer composition and a flow blocking polymer composition into hydrocarbon and water zones of a reservoir. The process comprises the production of the polymer compositions from the hydrocarbon zones concommitantly with the reaction of the flow blocking polymer composition in the water zones whereby a water shut-off is formed in the water zones. Conveniently, the production of the polymer compositions from the hydrocarbon zones if facilitated by reservoir pressure.

BRIEF DESCRIPTION OF THE SEVERAL VIEWS OF THE DRAWINGS

By way of example of the present invention, a novel water shut-off process will now be described in detail with reference to the accompanying drawings in which:

FIG. 1 illustrates schematically a gas reservoir accessed by a gas production well;

FIG. 2 illustrates schematically a first step of a novel process for establishing a water shut-off;

FIG. 3 illustrates schematically a second step of the novel process;

DETAILED DESCRIPTION OF THE INVENTION

Figure 4:
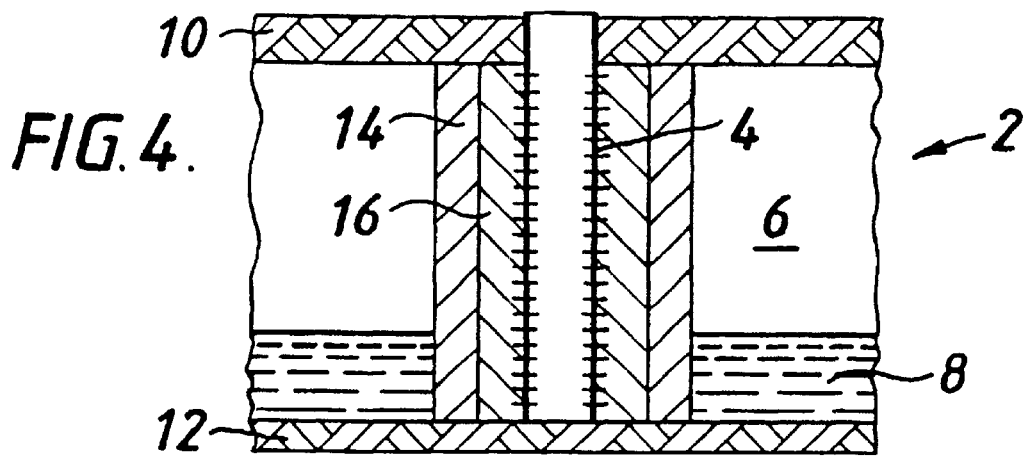
FIG. 4 illustrates schematically a third step of the novel process.

In overcoming the drawbacks of prior art water shut-off processes, the process provided by the present invention utilizes the benefits derived from using relative permeability modifiers in combination with a reliable and durable gel blocking polymer.

A reservoir to be accessed is comprises of two zones, i.e. an upper gas zone 6 and a lower water zone 8 located between upper and lower stratum 10 and 12.

After accessing the gas reservoir via the well bore 4, see FIG. 1, the novel process of forming a water shut-off is effected in five steps as shown schematically in FIGS. 2 to 6.

In the first step of the process a relative permeability modifier 14 such as FLOPERM 500 (RTM) is injected through the well bore 4 into the gas zone 6 and water zone 8 as indicated by the arrows in FIG. 2.

FLOPERM 500 is a cationic polyacrylamide polymer including a cross-linking agent.

Immediately upon completion of step one of the process, step two is effected by injecting a blocking gel 16, for example, MARASEAL, through the well bore 4 into the gas zone 6 and water zone 8 behind the relative permeability modifier 14 as indicated by the arrows in FIG. 3.

MARASEAL is a polyacrylamide-chromium acetate system having a low viscosity (~15 cp at 25° C.), controllable gel times and cross-links to a "ringing gel" of proven durability.

Step three of the novel process involves a shut-in for the reaction period of the relative permeability modifier 14. The reaction period is typically of 16 to 24 hours duration for FLOPERM 500; however, the reaction period must be compatible with the delayed gellation times of the polymers utilized in the process.

Figure 5:
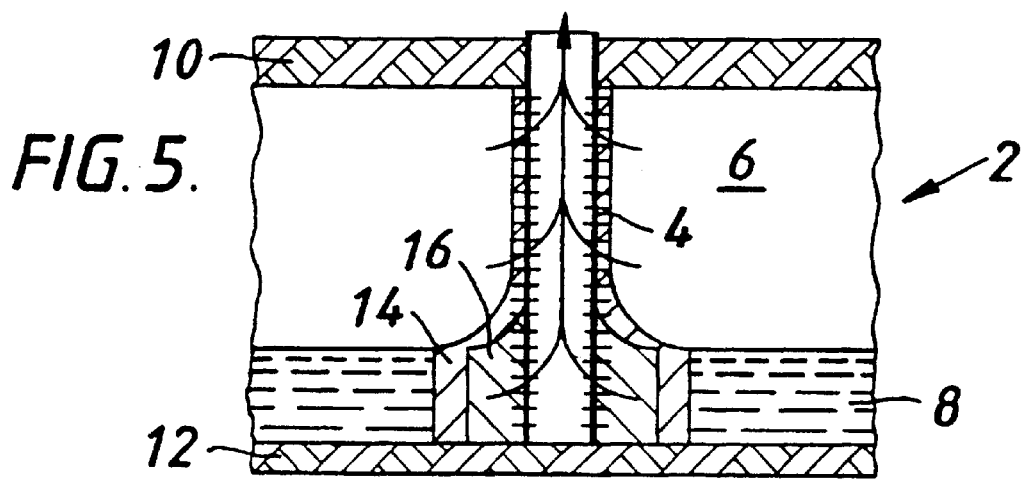
FIG. 5 illustrates schematically a fourth step of the novel process.

In step 4 the polymers, i.e., the FLOPERM 500 and the MARASEAL are back produced from the gas zone 6 utilizing the inherent pressure of the reservoir 2 to leave the pre-treatment relative permeability modifier 14 and the blocking gel 16 in the water zone 8, see FIG. 5.

Figure 6:
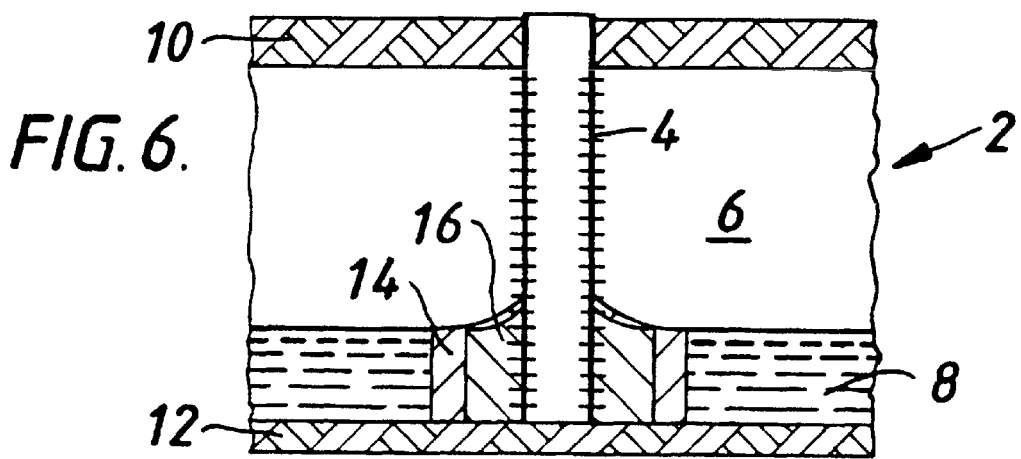
FIG. 6 illustrates schematically a fifth step of the novel process.

Back production of the polymers from the gas zone 6 is maintained into continuous gas production as indicated in FIG. 6, by which time the MARASEAL gels to a block in the water zone 8 to provide an effective and durable water shut-off.

What is claimed is:

1. A process for reducing water flow from a hydrocarbon production well comprising the steps of:
    (a) injecting a first chemical composition reactable to form a first polymer effective as a relative permeability modifier polymer into the hydrocarbon and water zones of a reservoir;
    (b) injecting a second chemical composition into said hydrocarbon and water zones, the second chemical composition reactable to form a flow blocking polymer;
    (c) effecting a "shut-in" for a reaction period of the first chemical composition to form the relative permeability modifier polymer;
    (d) producing the first chemical composition and the second chemical composition out from the hydrocarbon zones prior to reaction of the second chemical composition; and
    (e) maintaining the production of the first and second chemical compositions from the hydrocarbon zones to facilitate the creation of a passage for hydrocarbon flow therefrom while enabling the second chemical composition to react in the water zones to form a flow-blocking polymer for water shut-off.

2. The process according to claim 1 wherein step (b) of the process is effected immediately upon the completion of step (a) thereof.

3. A process according to claim 1 wherein the first chemical composition comprises a cross-linkable cationic polyacrylamide.

4. A process according to claim 1 wherein the second chemical composition comprises a cross-linkable polyacrylamide-chromium acetate system.

5. The process according to claim 1 wherein the second polymer composition has a low viscosity in the order of 15 cp at 25° C.

6. The process according to claim 1 wherein the reaction period of the first chemical composition is less than any delay period prior to reaction of the second chemical composition.

7. A process according to claim 1 wherein the reaction period of the first chemical composition is in the order of 16 hours.

8. A process for forming a water shut-off in a hydrocarbon production well including the injection of a first chemical composition reactable to form a polymer effective as a relatively permeable modifier polymer and a second chemical composition reactable to form a flow blocking polymer into hydrocarbon and water zones of a reservoir, said process comprising:
    producing a modifying polymer composition and a flow blocking polymer composition from the first and second chemical compositions, respectively, back from the hydrocarbon zones concomitantly with reacting the flow blocking polymer composition in the water zones whereby a water shut-off is formed in the water zones.

9. The process according to claim 1 wherein said step of maintaining the production of the first and second polymer compositions from the hydrocarbon zones comprises producing the polymer compositions back from the hydrocarbon zones facilitated by reservoir pressure.

10. The process according to claim 8 wherein said producing polymer compositions back from the hydrocarbon zones is facilitated by the reservoir pressure.

* * * * *